(12) United States Patent
Jo et al.

(10) Patent No.: US 10,270,069 B2
(45) Date of Patent: Apr. 23, 2019

(54) POUCH-TYPE SECONDARY BATTERY

(71) Applicant: LG Chem, Ltd., Seoul (KR)

(72) Inventors: Vin-Na Jo, Daejeon (KR); Jae-Hyun Lee, Daejeon (KR); Ji-Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/526,530

(22) PCT Filed: Feb. 5, 2016

(86) PCT No.: PCT/KR2016/001340
§ 371 (c)(1),
(2) Date: May 12, 2017

(87) PCT Pub. No.: WO2016/137141
PCT Pub. Date: Sep. 1, 2016

(65) Prior Publication Data
US 2017/0309871 A1    Oct. 26, 2017

(30) Foreign Application Priority Data
Feb. 27, 2015 (KR) .................. 10-2015-0028406

(51) Int. Cl.
*H01M 2/00* (2006.01)
*H01M 2/02* (2006.01)
(Continued)

(52) U.S. Cl.
CPC ........... *H01M 2/0277* (2013.01); *H01M 2/02* (2013.01); *H01M 2/0275* (2013.01); *H01M 2/18* (2013.01);
(Continued)

(58) Field of Classification Search
CPC .... H01M 2/0277; H01M 2/02; H01M 2/0275; H01M 2/18; H01M 2/021; H01M 2/0212;
(Continued)

(56) References Cited

U.S. PATENT DOCUMENTS

2008/0102354 A1    5/2008  Lee
2012/0107676 A1*   5/2012  Han .................. H01M 2/06
                                            429/179
(Continued)

FOREIGN PATENT DOCUMENTS

JP    2010080324 A    4/2010
JP    2014209415 A   11/2014
(Continued)

OTHER PUBLICATIONS

International Search Report from PCT/KR2016/001340, dated May 30, 2016.

*Primary Examiner* — Jane J Rhee
(74) *Attorney, Agent, or Firm* — Lerner, David, Littenberg, Krumholz & Mentlik, LLP

(57) ABSTRACT

The present invention provides a pouch-type secondary battery comprising: an electrode assembly having, repeatedly stacked therein, unit cells comprising a positive plate, a negative plate, and a separator positioned between the positive and negative plates, wherein the positive plate and negative plate are respectively provided with a positive electrode tab and a negative electrode tab, and the positive and negative electrode tabs each converge in a predetermined direction; and a pouch case for sealing the electrode assembly, the pouch-type secondary battery being characterized by taping in contact with the outer circumferential surface of the electrode assembly along the stacking thickness direction of the electrode assembly, at the end of the electrode assembly at the part where the tabs converge, (Continued)

thereby improving the safety of the pouch-type secondary battery.

19 Claims, 13 Drawing Sheets

(51) Int. Cl.
    *H01M 10/04*     (2006.01)
    *H01M 2/18*     (2006.01)
    *H01M 10/052*     (2010.01)
    *H01M 10/0585*     (2010.01)
    *H01M 10/42*     (2006.01)

(52) U.S. Cl.
    CPC ..... *H01M 10/0436* (2013.01); *H01M 10/052* (2013.01); *H01M 10/0585* (2013.01); *H01M 10/4235* (2013.01); *H01M 2/021* (2013.01); *H01M 2/0212* (2013.01); *H01M 2/0217* (2013.01); *Y02T 10/7011* (2013.01)

(58) Field of Classification Search
    CPC ........... H01M 2/0217; H01M 10/0436; H01M 10/052; H01M 10/0585; H01M 10/4235; H01M 10/7011
    See application file for complete search history.

(56) References Cited

U.S. PATENT DOCUMENTS

2012/0237809 A1     9/2012   Ahn et al.
2016/0056495 A1     2/2016   Minagata et al.

FOREIGN PATENT DOCUMENTS

| KR | 20080037861 A | 5/2008 |
| KR | 20080095967 A | 10/2008 |
| KR | 20100071790 A | 6/2010 |
| KR | 20120105730 A | 9/2012 |
| KR | 20140065592 A | 5/2014 |

\* cited by examiner

POUCH-TYPE SECONDARY BATTERY

CROSS-REFERENCE TO RELATED APPLICATION

This application is a national phase entry under 35 U.S.C. § 371 of International Application No. PCT/KR2016/001340, filed Feb. 5, 2016, which claims priority to Korean Patent Application No. 10-2015-0028406, filed Feb. 27, 2015, the disclosures of which are incorporated herein by reference.

TECHNICAL FIELD

The present disclosure relates to a pouch-type secondary battery, and more particularly, to a pouch-type secondary battery with improved safety against an internal short.

BACKGROUND ART

Generally, as opposed to disposable primary batteries, secondary batteries refer to rechargeable batteries, and are being widely used for electronic devices such as mobile phones, laptop computers and camcorders, or electric vehicles. Particularly, lithium secondary batteries are a fast growing trend in many industries due to having a higher capacity than nickel-cadmium batteries or nickel-hydrogen batteries widely used for a power source of electronic devices and high energy density per unit weight.

A lithium secondary battery uses lithium-based oxide and a carbon material for a positive electrode active material and a negative electrode active material, respectively. The lithium secondary battery has an electrode assembly including a positive electrode plate and a negative electrode plate respectively coated with the positive electrode active material and the negative electrode active material with a separator interposed therebetween, and a packaging, namely, a battery case, in which the electrode assembly is received together with an electrolyte solution in an airtight manner.

Lithium secondary batteries can be classified into can-type secondary batteries in which an electrode assembly is received in a metal can and pouch-type secondary batteries in which an electrode assembly is received in a pouch of an aluminum laminate sheet, according to the shape of the packaging. These secondary batteries are generally fabricated through a process in which an electrolyte solution is injected into a packaging where an electrode assembly is received, and the packaging is sealed.

On the other hand, because medium and large-sized battery packs are preferably manufactured to be as small and light as possible, prismatic batteries and pouch-type secondary batteries wherein stacking can be used to achieve integration and high capacity relative to weight can be obtained are mainly used for battery cells of medium and large-sized battery packs. Particularly, preference of pouch-type secondary batteries is high in recent years. Because pouch-type secondary batteries have light weight, have the low likelihood of electrolyte solution leakage, and is flexible in shape, their advantage is that secondary batteries having the same capacity can be realized with lower volume and mass.

A pouch-type secondary battery includes a pouch case and an electrode assembly as a basic structure. The electrode assembly has a structure in which a unit cell including a negative electrode plate, a separator, and a positive electrode plate is stacked in a repeated manner. Each unit cell has a positive electrode tab and a negative electrode tab, and the positive electrode tabs and the negative electrode tabs converge in a predetermined direction and are respectively joined to a positive electrode lead and a negative electrode lead having an attached insulation tape by a method such as resistance welding, ultrasonic welding, and laser welding. The electrode lead performs a function of electrically connecting the secondary battery to an external device.

The secondary battery is fabricated through a process of placing the electrode assembly in an internal space defined by the pouch case, a process of sealing the periphery of the pouch case except an electrolyte solution injection part by heat fusion, a process of injecting an electrolyte solution through the electrolyte solution injection part, a process of applying heat fusion to the electrolyte solution injection part to completely seal the pouch case, a process of tailoring an unnecessary residual portion of the electrolyte solution injection part, a process of aging the secondary battery, and a post-treatment process such as initial charging and testing.

The pouch-type secondary battery has an empty space between the pouch case and the electrode assembly according to the structural characteristics. Therefore, if the pouch-type secondary battery is placed in a situation such as vibration or collision, the electrode may poke out toward the empty space in the pouch case and come into contact with the tab portion, causing a short and a fire. Accordingly, there is a need for an approach to enhance the safety by solving the problem of the pouch-type secondary battery such as an internal short.

DISCLOSURE

Technical Problem

Therefore, the present disclosure is designed to solve the problem of the related art such as the above, and the present disclosure is directed to providing a pouch-type secondary battery with enhanced safety for preventing an internal short caused by the contact between an electrode plate and a tab with the movement of the electrode plate in the pouch-type secondary battery.

Technical Solution

To achieve the object, the present disclosure provides a pouch-type secondary battery including an electrode assembly including unit cells stacked repeatedly, each unit cell including a positive electrode plate, a negative electrode plate, and a separator interposed between the positive electrode plate and the negative electrode plate, the positive electrode plate and the negative electrode plate being respectively provided with a positive electrode tab and a negative electrode tab, each of the positive electrode tabs and the negative electrode tabs converging in a predetermined direction, and a pouch case in which the electrode assembly is received in an airtight manner, wherein an end part of the electrode assembly at a part where the tabs converge is taped wrapping an outer peripheral surface of the electrode assembly tightly, along a stack thickness-wise direction of the electrode assembly.

According to a preferred embodiment of the present disclosure, the taping may be performed in contact with the outer peripheral surface of the electrode assembly in a stack thickness-wise direction so that none of the electrode plates can poke out up or down.

According to another preferred embodiment of the present disclosure, the taping may be performed over an entire outer peripheral surface of the electrode assembly including a stack thickness-wise direction of the electrode assembly.

According to another preferred embodiment of the present disclosure, the taping may be performed using a swelling tape. More specifically, the swelling tape may include a base layer that deforms in a length-wise direction when the base layer comes into contact with a fluid, and an adhesive layer formed on at least one surface of the base layer.

According to another preferred embodiment of the present disclosure, the positive electrode tabs and the negative electrode tabs may be formed to converge in a same direction, or may be formed to converge in opposite directions.

According to another preferred embodiment of the present disclosure, the plurality of positive electrode tabs may be joined with each other and ends of the positive electrode tabs may be joined with a positive electrode lead, and the plurality of negative electrode tabs may be joined with each other and ends of the negative electrode tabs may be joined with a negative electrode lead.

According to another preferred embodiment of the present disclosure, the positive electrode lead and the negative electrode lead may further include an insulation tape at a sealing spot with the pouch case.

Advantageous Effects

According to an aspect of the present disclosure, the pouch-type secondary battery according to the present disclosure has a tape attached (taping) to the end where the tabs of the electrode assembly are provided, thereby preventing the electrode within the electrode assembly from poking out up or down.

Further, the taping prevents an internal short caused by the contact between the electrode and the tab, leading to enhanced safety of the pouch battery.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Figure 1:
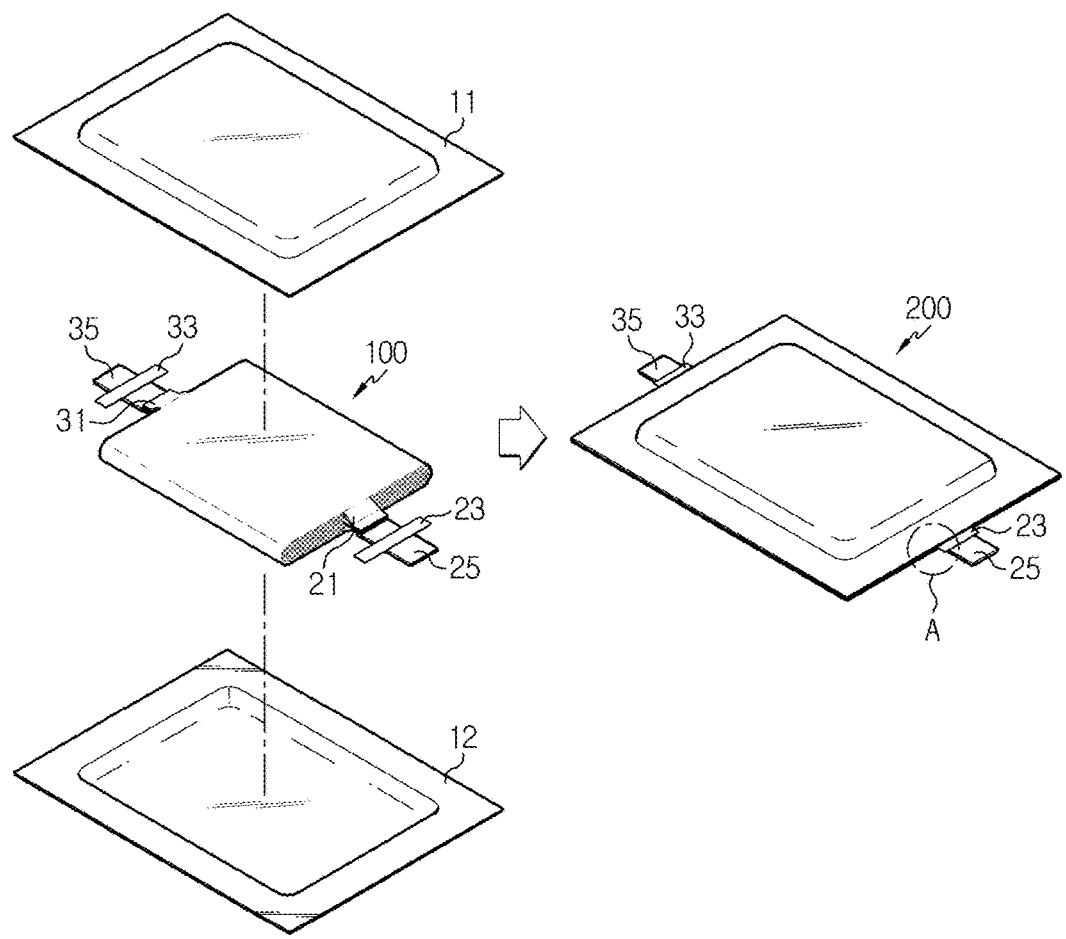
FIG. 1 is an exploded perspective view of the structure of a general pouch-type secondary battery.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Also, the configurations illustrated in the drawings and the embodiments are just preferable examples for the purpose of illustrations only, not intended to limit the scope of the disclosure, so it should be understood that other equivalents and modifications could be made thereto without departing from the scope of the disclosure.

The present disclosure is directed to a pouch-type secondary battery including an electrode assembly formed by stacking unit cells in a repeated manner, each unit cell including a positive electrode plate, a negative electrode plate, and a separator interposed between the positive electrode plate and the negative electrode plate, the positive electrode plate and the negative electrode plate respectively having a positive electrode tab and a negative electrode tab, each of the positive electrode tabs and the negative electrode tabs converging in a predetermined direction; and a pouch case to receive the electrode assembly in an airtight manner, wherein an end part of the electrode assembly at the part where the tabs converge is taped wrapping an outer peripheral surface of the electrode assembly tightly, along a stack thickness-wise direction of the electrode assembly.

Generally, seeing the structure of a pouch-type secondary battery referring to FIG. 1, the pouch-type secondary battery includes a pouch case 11, 12 and an electrode assembly 100 as a basic structure. The electrode assembly 100 has a structure in which unit cells are stacked in a repeated manner, each unit cell including a positive electrode plate, a separator, and a negative electrode plate. Each unit cell has a positive electrode tab 21 and a negative electrode tab 31, and the positive electrode tabs 21 and the negative electrode tabs 31 converge in a predetermined direction and are respectively joined to a positive electrode lead 25 and a negative electrode lead 35 having attached insulation tapes 23 and 33 by a method such as resistance welding, ultrasonic welding, and laser welding.

Figure 2:
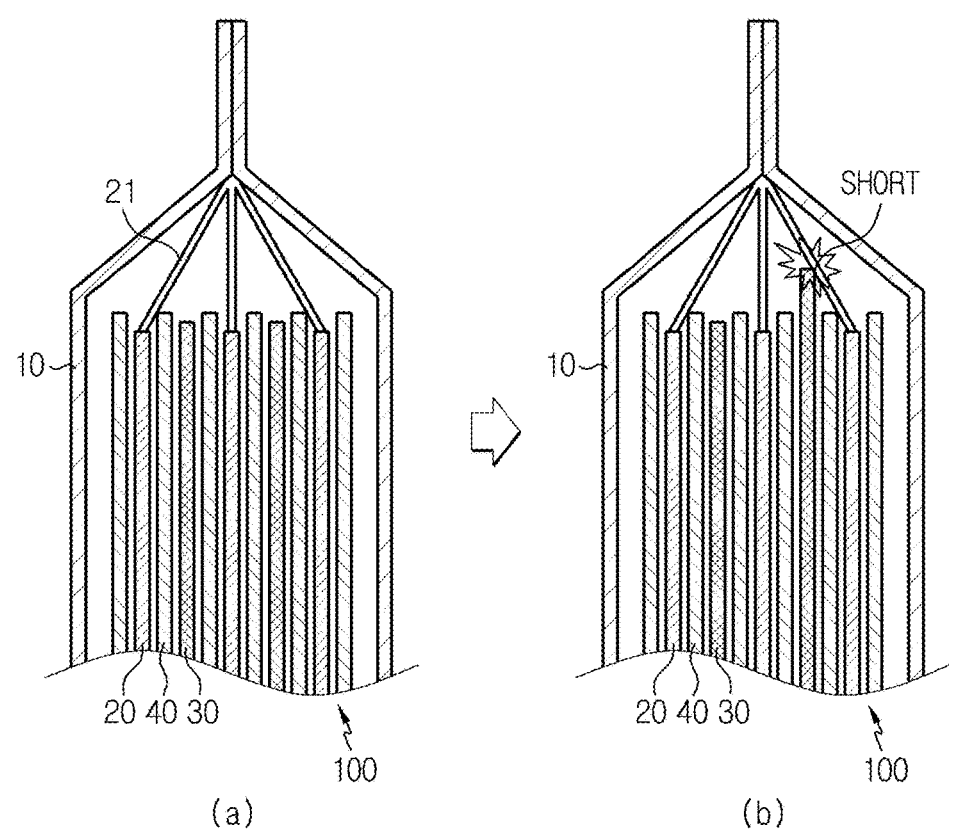
FIG. 2 is a schematic cross-sectional view of a conventional pouch-type secondary battery in a stack thickness-wise direction of an electrode assembly, showing a situation in which an internal short occurs.

FIG. 2 is a schematic cross-sectional view of section A of FIG. 1 in the stack direction of the unit cells within the electrode assembly, and as shown in FIG. 2, a positive electrode plate 20 coated with a positive electrode active material, a negative electrode plate 30 coated with a negative electrode active material, and a separator 40 electrically isolating the positive electrode plate from the negative electrode plate are stacked in a pouch case 10, and the positive electrode plate 20 has a positive electrode tab 21 and the positive electrode tabs converge in contact with each other. In this instance, as can be seen from FIG. 2, an empty space is inevitably created between the pouch and the electrode assembly according to the structure of the pouch secondary battery, and when the pouch-type secondary battery is placed in a situation such as vibration or collision, the positive electrode plate or the negative electrode plate of the electrode assembly may poke out therefrom up or down, and as shown in b) of FIG. 2, an internal short may occur when the electrode plate comes into contact with a tab.

To solve the problem, the present disclosure tapes an end part of the electrode assembly at the part where the tabs converge, along the stack thickness-wise direction of the electrode assembly, to prevent the electrode plate from poking out up or down.

The taping according to the present disclosure is described in more detail through the drawings, and the drawings depict the structure according to an embodiment of the present disclosure, and are not limited thereto.

Figure 3:
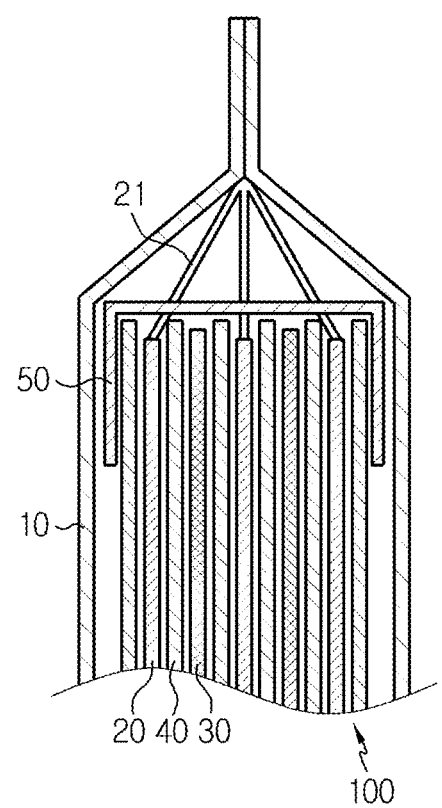
FIG. 3 is a schematic cross-sectional view of a pouch-type secondary battery in a stack thickness-wise direction of an electrode assembly according to an embodiment of the present disclosure.

More specifically, the end part of the electrode assembly at the part where the tabs converge (the upside and downside of the electrode assembly if the tabs are formed to converge on the opposite sides, for example, the upside and downside, or the upside of the electrode assembly if the tabs are formed to converge on the same side, for example, the upside) is taped near the tabs at an area where no tab is present, along the cell stack thickness-wise direction within the electrode assembly. FIG. 3 is a cross-sectional view of the pouch-type secondary battery in the stack direction of the electrode assembly, showing that a tape 50 is attached to prevent the electrode within the electrode assembly from poking out up and/or down.

Figure 4:
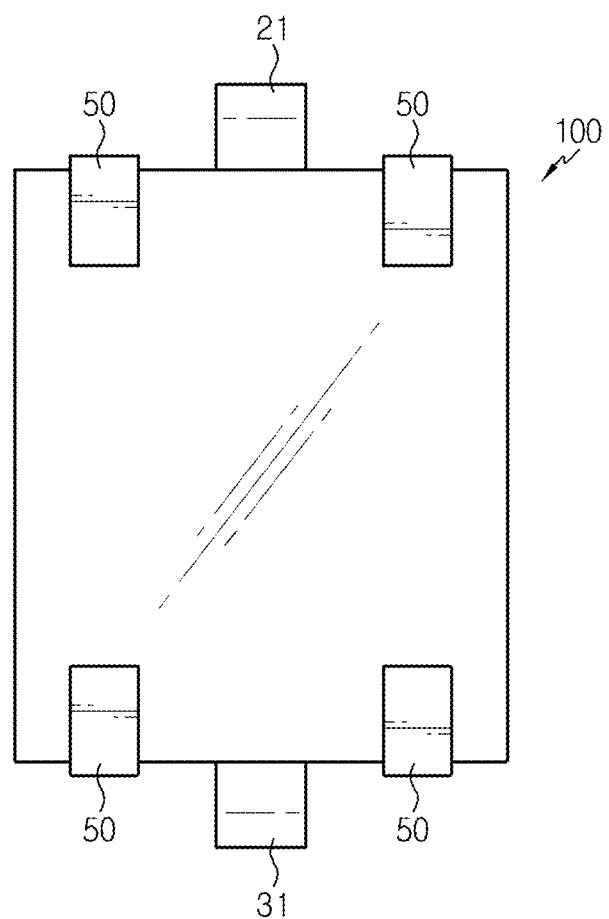
FIG. 4 is a schematic top view of an electrode assembly of a pouch-type secondary battery according to an embodiment of the present disclosure.

FIG. 4 is a schematic top view of the electrode assembly of the pouch-type secondary battery, and it can be seen that the positive electrode tabs are formed on the upside of the electrode assembly and the negative electrode tabs are formed on the downside of the electrode assembly (the positive electrode tabs and the negative electrode tabs may be changed in position), and the tape 50 is attached near the tabs at an area where no tab is present on the upside and downside of the electrode assembly, along the stack thickness-wise direction of the electrode assembly, such that the tape 50 comes into contact with the outer peripheral surface of the electrode assembly.

Figure 5:
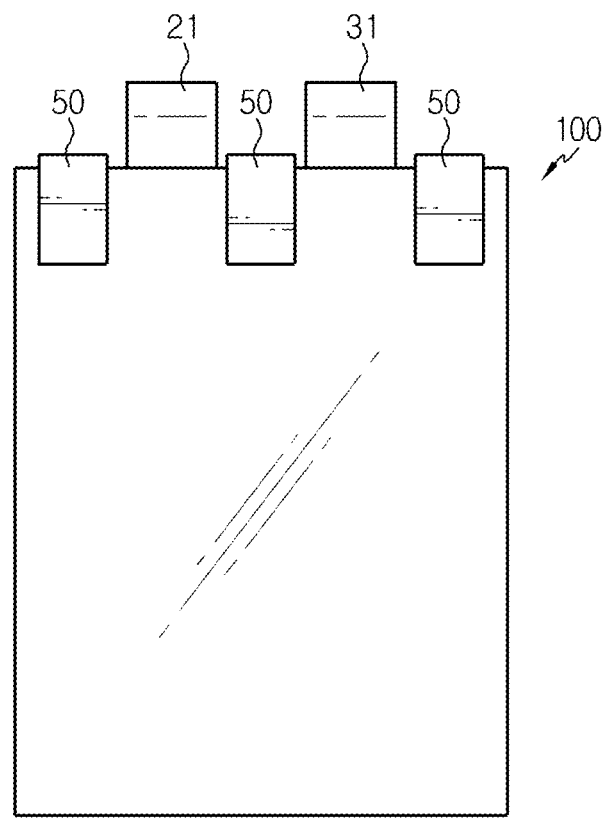
FIG. 5 is a schematic top view of an electrode assembly of a pouch-type secondary battery according to another embodiment of the present disclosure.

Alternatively, as shown in FIG. 5, when the positive electrode tabs and the negative electrode tabs are formed to converge in the same direction (the positive electrode tabs and the negative electrode tabs may be changed in position) and positioned on only one side of the electrode assembly, the tape 50 may be attached near the tabs at an area where no tab is present on one side of the electrode assembly, along the stack thickness-wise direction of the electrode assembly, such that the tape 50 comes into contact with the outer peripheral surface of the electrode assembly.

Figure 8:
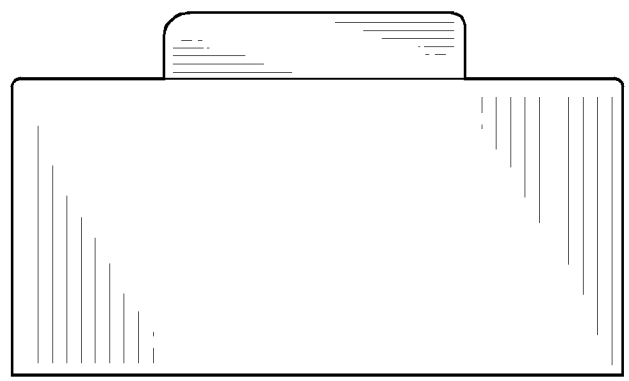
FIG. 8 is a photographic top view of a conventional electrode assembly formed by stacking unit cells in a repeated manner, including an end part where positive electrode tabs converge.
Figure 9A:
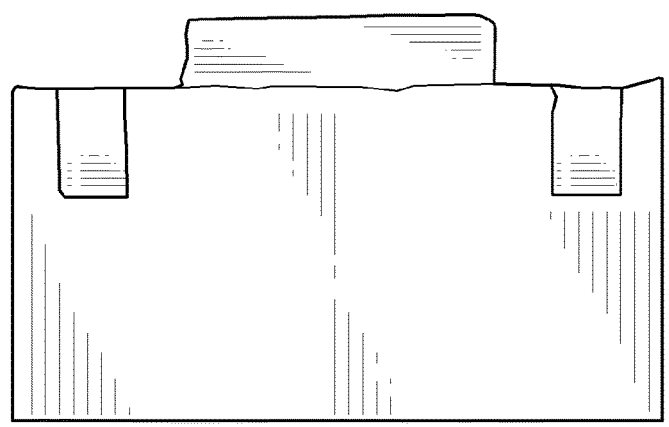
FIG. 9a is a photographic top view of an electrode assembly according to an embodiment of the present disclosure, the electrode assembly formed by stacking unit cells in a repeated manner and taped in a thickness-wise direction at an electrode assembly end part where positive electrode tabs converge.
Figure 9B:
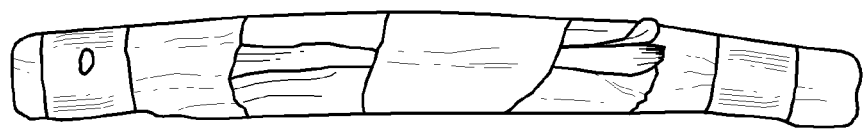
FIG. 9b is a photographic front view of an electrode assembly according to an embodiment of the present disclosure, the electrode assembly formed by stacking unit cells in a repeated manner and taped in a thickness-wise direction at an electrode assembly end part where positive electrode tabs converge.
Figure 9C:
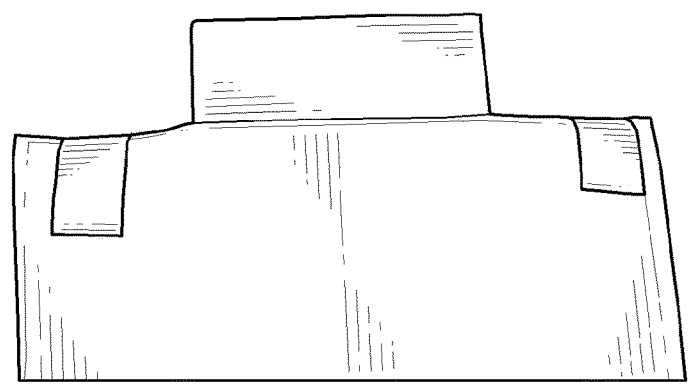
FIG. 9c is a photographic top view of an electrode assembly according to an embodiment of the present disclosure, the electrode assembly formed by stacking unit cells in a repeated manner and taped in a thickness-wise direction at an electrode assembly end part where negative electrode tabs converge.

A photographic image of the electrode assembly taped with the positive electrode tabs interposed between according to an embodiment of the present disclosure is shown in FIGS. 9a and 9c, and a photographic image of the electrode assembly taped with the negative electrode tabs interposed between is shown in FIG. 9b. For comparison, a photographic image of an untaped electrode assembly according to a related art is shown in FIG. 8.

The tape is thick enough to tape at an area near the tabs on the top/bottom of the electrode assembly to prevent the electrode plate from poking out up or down, and the thickness is not limited thereto.

Also, the tape is long enough to come into contact with the outer peripheral surface of the electrode assembly, and the length of the tape is greater than the stack thickness of the electrode assembly, but is not limited thereto.

Figure 10A:
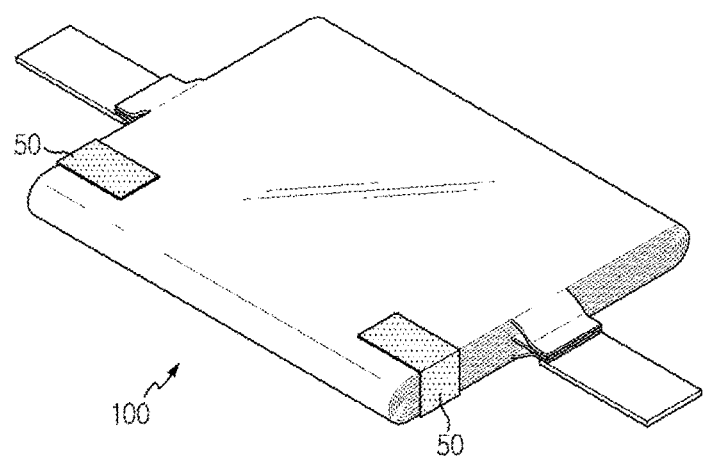
FIG. 10a is a schematic diagram of an electrode assembly according to an embodiment of the present disclosure, the electrode assembly taped in a thickness-wise direction of each of positive electrode tabs and negative electrode tabs of the electrode assembly.

For example, as shown in FIG. 10a, the tape 50 may be attached to the end part of the electrode assembly 100 in the thickness-wise direction and prevent any electrode of the electrode assembly from poking out while not causing any significant volume increase of the electrode assembly, the length of the tape extending on the front surface or the rear surface of the electrode assembly across the stack thickness of the electrode assembly may be 1 to 50% or 10 to 30% of the length of the electrode assembly.

Figure 10B:
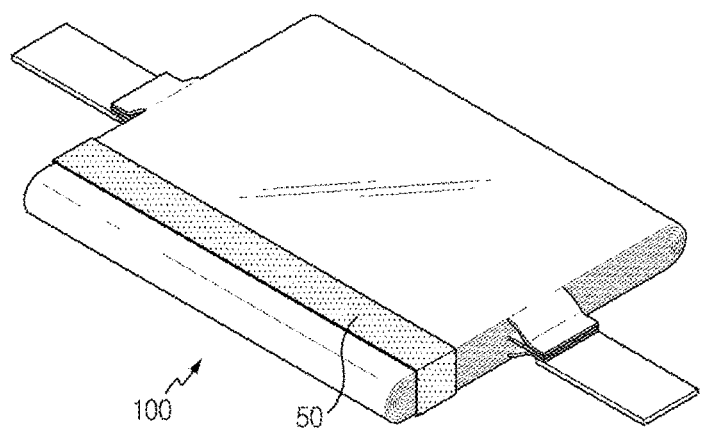
FIG. 10b is a schematic diagram of an electrode assembly taped over the entire outer peripheral surface of the electrode assembly including a stack thickness-wise direction of the electrode assembly.

Alternatively, as shown in FIG. 10b, the tape 50 may be attached to surround the entire outer peripheral surface of the electrode assembly including the thickness-wise direction of the electrode assembly 100, and in this case, as compared to the aspect of FIG. 10a illustrating the taping in the thickness-wise direction with respect to the end part of the electrode assembly, there is a disadvantage because a volume increase occurs, while there is an advantage because the electrode assembly can be held more firmly in the up or down direction.

More preferably, the taping may be accomplished with a swelling tape. The swelling tape according to the present disclosure is a tape having swelling properties when immersed in an electrolyte solution, and as shown in b) of FIG. 6, in fabricating the pouch secondary battery, when impregnated with an electrolyte solution, the swelling tape swells and can prevent the electrode assembly from moving and fills an empty space between the electrode assembly and the pouch, thereby maximizing the effect on the internal short prevention.

Preferably, the swelling tape may include a base layer and an adhesive layer formed on at least one surface of the base layer. In the foregoing, the base layer is a base layer that deforms in the length-wise direction when it comes into contact with a fluid such as a liquid.

Figure 6:
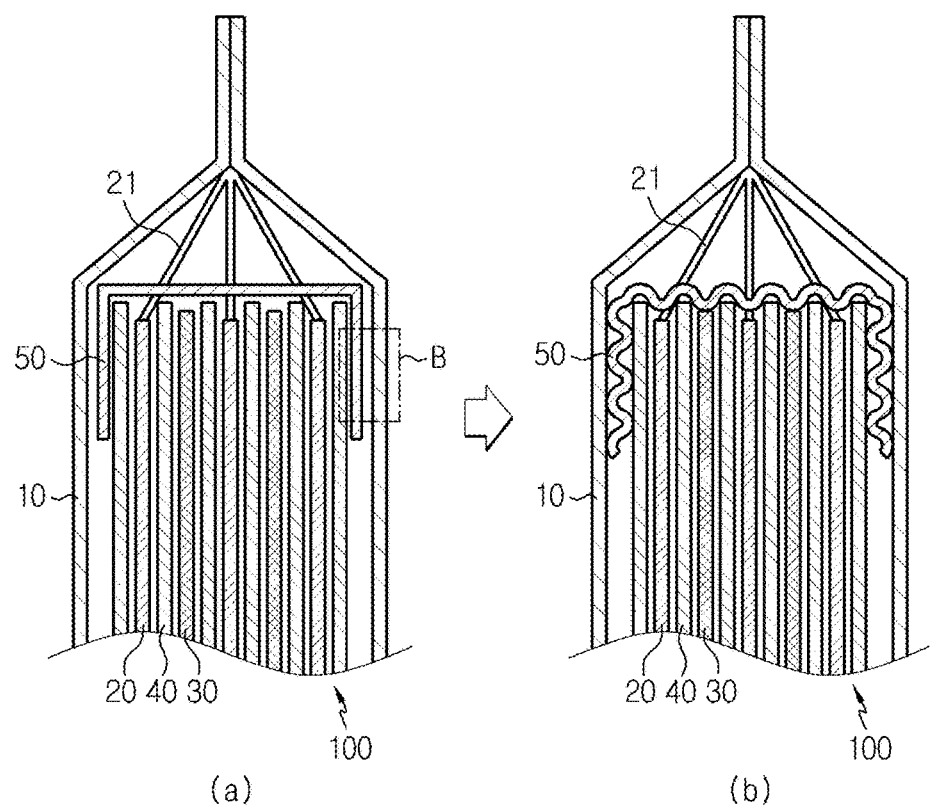
FIG. 6 is a schematic cross-sectional view of a pouch-type secondary battery in a thickness-wise direction of an electrode assembly according to an embodiment of the present disclosure, showing a swelling phenomenon of a swelling tape when an electrolyte solution is injected.
Figure 7:
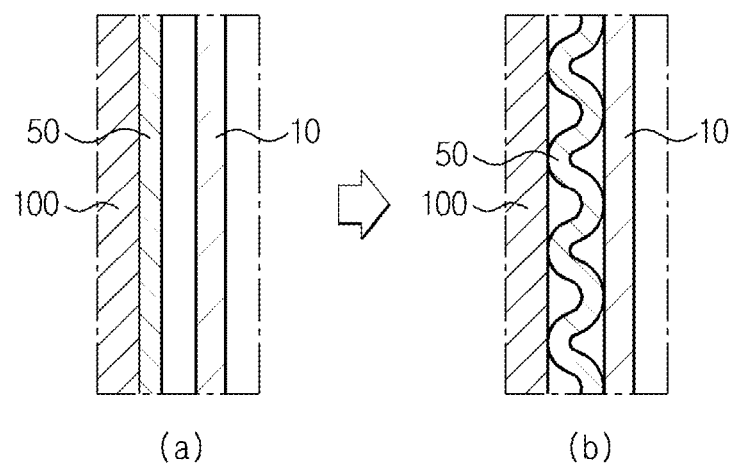
FIG. 7 is a diagram showing a swelling phenomenon of a swelling tape according to an embodiment of the present disclosure.

More specifically, FIG. 7 is a detailed cross-sectional view of section B of FIG. 6, and as shown in FIG. 7, the swelling tape 50 is attached in contact with the outer peripheral surface of the electrode assembly along the stack thickness-wise direction of the electrode assembly 100, and there may be a predetermined gap between the swelling tape 50 and the pouch case 10. In this instance, when an electrolyte solution is injected into the pouch-type secondary battery, the swelling tape expands in the length-wise direction with the introduction of a fluid into the gap. In the foregoing, the base layer expands in a state that the swelling tape 50 is fixed to the electrode assembly 100 by the adhesive layer, incorporating the swelling tape 50 in solid shape, and the gap is filled by the solid shape.

The dimension of the solid shape dependent on the size of the gap to which the swelling tape is applied may be controlled, for example, by adjusting the deformation ratio of the base layer or the peel force of the adhesive layer.

The term ⌈length-wise direction⌋ as used herein refers to a direction perpendicular to the thickness-wise direction of the base layer when the base layer is maintained in a plane state. Also, the term ⌈up and/or down⌋ or ⌈horizontal⌋ as used herein refers to substantially up and/or down direction horizontal without detracting from the intended effect, and may include, for example, a tolerance of ±10 degrees or less, ±5 degrees or less, or ±3 degrees or less.

The base layer includes those that can deform, for example, expand in any direction including the up and/or down or horizontal, or diagonal direction on the plane of the base layer, so long as they have a deforming property, for example, an expanding property in the length-wise direction. In an example, the base layer may have a deformation ratio in the length-wise direction larger than or equal to 5% or 10%.

For example, films including polyurethane may be used for the base layer. In the foregoing, including polyurethane refers to a film made by applying a material including polyurethane to a film forming method. The forming method of the film may include, but is not limited to, known methods. The polyurethane may include, for example, thermoplastic polyurethane (TPU). Known thermoplastic polyurethanes include polyester TPU, polyether TPU or polycaprolactone TPU, and an optimal type may be selected from them, but the use of polyester TPU may be appropriate. Also, the thermoplastic polyurethane may include aromatic- or aliphatic-based thermoplastic polyurethane. The polyurethane may include, a reaction product of a mixture of a polyol compound, for example, a polyester polyol compound, a chain extender, and an isocyanate compound, for example, an aromatic or aliphatic di-isocyanate compound, and in the foregoing, polyurethane having intended properties may be provided by controlling the ratio or type of the polyol compound forming soft chains, the chain extender and the isocyanate compound forming hard chains. In an example, the base layer may include polyester-based thermoplastic polyurethane, and if necessary, the polyurethane in which a weight ratio of units derived from the polyester polyol and units of the isocyanate compound and/or the chain extender is controlled to an optimum range can be used. The polyurethane may include, for example, those having a melt index (MI) of from about 5 to 12, from about 6 to 11, from about 6 to 10 or from about 7 to 10 when measured at the temperature of about 210° C. and about 2.16 Kg.

The base layer may have a monolayer structure of the film including polyurethane or a multilayer structure at least including the film including polyurethane. When the base layer includes a film other than the polyurethane film, such a film is a polymer film or sheet, and may be a film or sheet that is manufactured to show deforming characteristics such as above, for example, expanding characteristics when it is contacted with a fluid by stretching or shrinking process conditions during manufacture.

An adhesive layer is formed on at least one surface of the base layer. For example, the adhesive layer may be formed on one surface of the base layer in the direction parallel to the length-wise direction of the base layer. The swelling tape may have a 3D shape jutting in the direction perpendicular to the length-wise direction of the base layer, when the tape expands in contact with a fluid in such a state that the tape is fixed by the adhesive layer formed in the direction parallel to the length-wise direction of the base layer as described above.

The adhesive layer includes various types of adhesive layers provided that they can show the peelability. For example, the adhesive layer includes acrylic adhesives, urethane adhesives, epoxy adhesives, silicone adhesives or rubber-based adhesives.

Further, the electrolyte solution or fluid that deforms, for example, expands the swelling tape in the foregoing is not limited to a particular type, and electrolyte solutions known in the art are used depending on the type of the battery. For example, when the battery is a lithium secondary battery, the electrolyte may include, for example, a nonaqueous organic solvent and a lithium salt. In the foregoing, the lithium salt is dissolved in the organic solvent, and may act as a supply source of lithium ions in the battery and promote the movement of lithium ions between the positive electrode and negative electrode.

Hereinafter, the pouch-type secondary battery structure according to the present disclosure is described in more detail. The secondary battery according to the present disclosure is a pouch-type secondary battery and has a structure in which the electrode assembly 100 is received in the pouch case 10. The electrode assembly 100 may comprise an assembly of unit cells, similar to known pouch-type secondary batteries.

The unit cell includes the positive electrode plate 20 coated with the positive electrode active material, the negative electrode plate 30 coated with the negative electrode active material, and the separator 40 which electrically separates the positive electrode plate 20 from the negative electrode plate 30. The positive electrode active material and the negative electrode active material may be coated on one surface or both surfaces of the positive electrode plate and the negative electrode plate. The separator for electrical insulation is interposed between adjacent unit cells.

The positive electrode plate 20 is primarily made of aluminum. Alternatively, the positive electrode plate may be made of stainless steel, nickel, titanium, sintered carbon or aluminum or stainless steel surface-treated with carbon, nickel, titanium, and silver on the surface. Further, any material may be used for the positive electrode plate without limitations provided that the material has high conductivity while not causing any chemical changes to the secondary battery.

The positive electrode plate 20 is provided with the positive electrode tab 21 at a certain area, and the positive electrode tab may be formed extending from the positive electrode plate. Alternatively, the positive electrode tab may be formed by joining a member of a conducting material to a predetermined portion of the positive electrode plate, for example, through welding. Further, the positive electrode tab may be formed by applying a positive electrode material to a certain area of the outer peripheral surface of the positive electrode plate and drying it.

The negative electrode plate 30 opposite to the positive electrode plate is primarily made of copper. Alternatively, the negative electrode plate may be made of stainless steel, aluminum, nickel, titanium, sintered carbon, copper or stainless steel surface-treated with carbon, nickel, titanium, and silver on the surface, and aluminum-cadmium alloys may be also used.

The negative electrode plate 30 may have a fine textured structure on the surface in the same way as the positive electrode plate to enhance the bond strength of the active material, and may be embodied in various forms such as films, sheets, foils, porous structures, foams, and nonwovens.

The negative electrode plate 30 is also provided with the negative electrode tab 31 at a certain area, and similar to the positive electrode tab described previously, the negative electrode tab may be formed extending from the negative electrode plate, and may be joined by a method of welding a member of a conducting material to a predetermined portion of the negative electrode plate and may be formed by applying a negative electrode material to a certain area of outer peripheral surface of the negative electrode plate and drying it.

The positive electrode active material includes lithium-containing transition metal oxide or lithium chalcogenide compounds. Typical examples include metal oxide such as $LiCoO_2$, $LiNiO_2$, $LiMnO_2$, $LiMn_2O_4$, $LiFePO_4$ or $Li_{1+z}Ni_{1-x-y}Co_xM_yO_2$ ($0 \leq x \leq 1$, $0 \leq y \leq 1$, $0 \leq x+y \leq 1$, $0 \leq Z \leq 1$, M denotes metals such as Al, Sr, Mg, La, Mn). The negative electrode active material includes carbon materials such as crystalline carbon, amorphous carbon, carbon complexes and carbon fibers, lithium metals and lithium alloys.

The type and chemical composition of the positive electrode active material and the negative electrode active material may change depending on the type of the secondary battery, and it should be understood that the above particular example is for illustration purposes only.

The separator 40 prevents short circuits between the positive electrode plate 20 and the negative electrode plate 30. In addition, the separator provides a channel for movement of particles with electric charges, for example, lithium ions. The separator includes known separators such as polyolefin-based polymer membranes of polypropylene and polyethylene or their multilayer membranes, microporous films, wovens and nonwovens.

The separator may be made of any material which prevent short circuits between the negative electrode and the positive electrode without limitations, and as a non-limiting example, the separator has a porous polymer substrate and a porous coating layer formed on at least one surface of the porous polymer substrate, and the porous coating layer includes inorganic particles and a binder polymer. Further, the inorganic particles included in the porous coating layer that can be used in the present disclosure are packed such that they come into contact with each other, and are bound with each other by the binder polymer, thereby interstitial volumes are formed between the inorganic particles, and the interstitial volumes between the inorganic particles becomes a void space to form pores. That is, the binder polymer allows the inorganic particles to be attached to each other to maintain the bound state of the inorganic particles, and for example, the binder polymer connects and holds the inorganic particles together. Further, the pores of the porous coating layer are pores formed with the interstitial volumes between the inorganic particles that define voids, and this is a space defined by the inorganic particles substantially in surface contact in a packed structure (closed packed or densely packed) by the inorganic particles. The pores of the porous coating layer provide a channel for movement of lithium ions essential to operate the battery.

The terms electrode, positive electrode and negative electrode can be interchangeably used herein, and the term electrode collectively refers to the positive electrode and the negative electrode and can be equally applied to both the positive electrode and the negative electrode.

The structure of the unit cell is not limited to those disclosed in the drawings. Accordingly, the unit cell may have both a bi-cell structure in which the polarity of the outermost electrodes is identical and a full cell structure in which the polarity of the outermost electrodes is opposite.

The full cell is a cell with a basic structure of positive electrode plate/separator/negative electrode plate in which a positive electrode plate and a negative electrode plate are disposed at the outermost of the cell. Examples of the full cell include a positive electrode plate/separator/negative electrode plate cell with the most basic structure, and a positive electrode plate/separator/negative electrode plate/separator/positive electrode plate/separator/negative electrode plate cell.

The bi-cell is a cell with a structure in which electrodes with the same polarity are disposed at the outermost of the cell, such as a unit structure of positive electrode plate/separator/negative electrode plate/separator/positive electrode plate and a unit structure of negative electrode plate/separator/positive electrode plate/separator/negative electrode plate.

The electrode assembly may have not only a simple stack-type structure but also a variety of structures. Preferably, the electrode assembly may have a stack-folding type structure. The stack-folding type structure is a structure formed by arranging unit cells on a separator at a predetermined interval and folding the separator in a predetermined direction. The stack-folding type structure is disclosed in Korean Patent Publication No. 10-2008-0095967 to the Applicant and its detailed description is omitted herein. On the other hand, the present disclosure is not limited to a particular structure of the cell assembly. Thus, any cell assembly structure known as being in a pouch-type case can be employed for the cell assembly structure according to the present disclosure.

The positive electrode tabs 21 and the negative electrode tabs 31 are joined to the positive electrode lead 25 and the negative electrode lead 35, respectively. For improved process performance, it is preferred to join the electrode tabs with the same polarity and then join the joined parts of the electrode tabs to the electrode lead.

The joining of the electrode tabs or the joining of the electrode tabs and the electrode lead may be performed using known welding methods such as resistance welding, ultrasonic welding and laser welding or using a conductive adhesive.

The electrode assembly having the electrode tabs joined to the electrode leads is received in the pouch case 10 in an airtight manner through an electrolyte solution injection process and a sealing process. The pouch case has a structure in which upper and lower surfaces of a metal thin-film are laminated with an insulating polymer. The metal thin-film keeps the outside moisture and gas from invading the electrode assembly, and prevents the chemical materials injected in the pouch case from flowing out, along with improving the mechanical strength of the pouch case. The metal thin-film may be made of any one selected from alloys of iron, carbon, chrome and manganese, alloys of iron, chrome and nickel, aluminum or their equivalents, but is not limited thereto. When the metal thin-film is made of a material containing iron, the mechanical strength increases, and when the metal thin-film is made of a material containing aluminum, flexibility is improved. Generally, aluminum metal foils are preferably used.

The pouch case 10 includes the upper case 11 and the lower case 12. The lower case has a groove corresponding to the shape of the lower part of the electrode assembly so that the lower part of the electrode assembly is seated in the groove. Also, the upper case has a groove corresponding to the shape of the upper part of the electrode assembly so that the upper part of the electrode assembly is seated in the groove. The groove may be omitted according to circumstances. Further, the upper case and the lower case may be separated from each other, and may be connected to each other while they share one side.

When the electrode assembly is seated in the groove of the lower case, the upper part of the electrode assembly is covered with the upper case and the circumferential part of the lower case and the upper case is sealed through a heat sealing process.

To perform a heat sealing process, the inner surface of the pouch case may have a thermal adhesive layer made of tri-block copolymers of modified polypropylene such as casted polypropylene (CPP) and polypropylene, butylene and ethylene.

The thermal adhesive layer has a thickness between about 30 and 40 um, and may be coated or laminated on the metal thin-film. Further, the outer surface of the pouch case generally has an outer layer made of nylon or polyethyleneterephthalate to keep the metal thin-film from being exposed to the outside and prevent scratches on the metal thin-film.

During the heat sealing process, to inject an electrolyte solution necessary for the electrochemical operation of the electrode assembly into the pouch case, heat sealing is performed except a portion of the circumferential part of the lower case and upper case, namely, an electrolyte solution injection part, followed by injection of an electrolyte solution, and the pouch case having the electrode assembly therein is sealed by heat sealing the electrolyte solution injection part.

To improve the adhesion of the pouch case 10 and the electrode leads 25, 35, the electrode leads preferably have insulation tapes 23, 33. The insulation tape is not limited to a particular type of material provided that the material has insulating properties and can improve the adhesion of the electrode leads and the pouch case.

For example, the insulation tape may be made of polyethylene, polyacetylene, PTFE, nylon, polyimide, polyethyleneterephthalate, polypropylene, or synthesized materials thereof.

While the present disclosure has been hereinabove described with respect to a limited number of embodiments and drawings, the present disclosure is not limited thereto and it should be understood that various modifications and changes can be made by those skilled in the art within the scope of the technical aspects of the present disclosure and the appended claims and their equivalents.

On the other hand, although the terms indicating the directions such as up, down, left and right have been used herein, these terms are only for convenience of description, and it is obvious to those skilled in the art that the terms may be changed depending on the position of target objects or observers.

What is claimed is:

1. A pouch-type secondary battery, comprising:
    an electrode assembly comprising unit cells stacked repeatedly, each unit cell comprising a positive electrode plate, a negative electrode plate, and a separator interposed between the positive electrode plate and the negative electrode plate, the positive electrode plate and the negative electrode plate being respectively provided with a positive electrode tab and a negative electrode tab, each of the positive electrode tabs and the negative electrode tabs converging in a predetermined direction; and
    a pouch case in which the electrode assembly is received in an airtight manner,
    wherein an end part of the electrode assembly at a part where the tabs converge is taped with a swelling tape wrapping an outer peripheral surface of the electrode assembly, along a stack thickness-wise direction of the electrode assembly, the swelling tape comprising a base layer that deforms in a length-wise direction at a deformation ratio larger than or equal to 5% when the base layer comes into contact with a fluid, and an adhesive layer formed on at least one surface of the base layer.

2. The pouch-type secondary battery according to claim 1, wherein the taping is performed in a stack thickness-wise direction of the electrode assembly to prevent the positive electrode plate and the negative electrode plate from poking out up or down.

3. The pouch-type secondary battery according to claim 1, wherein the taping is performed over an entire outer peripheral surface of the electrode assembly including a stack thickness-wise direction of the electrode assembly.

4. The pouch-type secondary battery according to claim 1, wherein the positive electrode tabs and the negative electrode tabs converge in a same direction.

5. The pouch-type secondary battery according to claim 1, wherein the positive electrode tabs and the negative electrode tabs converge in opposite directions.

6. The pouch-type secondary battery according to claim 1, wherein each of the positive electrode tabs are joined with each other and ends of the positive electrode tabs are joined with a positive electrode lead, and each of the negative electrode tabs are joined with each other and ends of the negative electrode tabs are joined with a negative electrode lead.

7. The pouch-type secondary battery according to claim 6, wherein the positive electrode lead and the negative electrode lead further comprise an insulation tape at a sealing spot with the pouch case.

8. The pouch-type secondary battery of claim 1, wherein the electrode assembly has a stack-folding type structure, and the swelling tape is at an area near the tabs on a top, a bottom, or the top and the bottom of the electrode assembly.

9. The pouch-type secondary battery according to claim 1, wherein the base layer comprises a polyurethane material.

10. The pouch-type secondary battery according to claim 9, wherein the polyurethane material has a melt index (MI) in a range of approximately 5 to approximately 12 when measured at a temperature of approximately 210° C. and at a weight of approximately 2.16 kg.

11. The pouch-type secondary battery according to claim 10, wherein the range of the MI is approximately 6 to approximately 11.

12. The pouch-type secondary battery according to claim 10, wherein the range of the MI is approximately 6 to approximately 10.

13. The pouch-type secondary battery according to claim 10, wherein the range of the MI is approximately 7 to approximately 10.

14. The pouch-type secondary battery according to claim 1, wherein the base layer comprises a thermoplastic polyurethane (TPU) material.

15. The pouch-type secondary battery according to claim 14, wherein the TPU material is selected from the group consisting of: a polyester TPU material, a polyether TPU material, a polycaprolactone TPU material, and combinations thereof.

16. The pouch-type secondary battery according to claim 1, wherein the adhesive layer comprises an adhesive selected from the group consisting of: an acrylic adhesive, a urethane adhesive, an epoxy adhesive, a silicon adhesive, a rubber-based adhesive, and combinations thereof.

17. The pouch-type secondary battery according to claim 1, wherein the adhesive layer is formed on the at least one surface of the base layer in a direction parallel to the length-wise direction of the base layer.

18. The pouch-type secondary battery according to claim 1, wherein the base layer deforms in the length-wise direction at a deformation ratio larger than or equal to 10% when the base layer comes into contact with a fluid.

19. A pouch-type secondary battery, comprising:
an electrode assembly comprising unit cells stacked repeatedly, each unit cell comprising a positive electrode plate, a negative electrode plate, and a separator interposed between the positive electrode plate and the negative electrode plate, the positive electrode plate and the negative electrode plate being respectively provided with a positive electrode tab and a negative electrode tab, each of the positive electrode tabs and the negative electrode tabs converging in a predetermined direction; and
a pouch case in which the electrode assembly is received in an airtight manner,
wherein an end part of the electrode assembly at a part where the tabs converge is taped with a swelling tape wrapping an outer peripheral surface of the electrode assembly, along a stack thickness-wise direction of the electrode assembly, the swelling tape comprising a base layer and an adhesive layer formed on at least one surface of the base layer, wherein the base layer comprises a polyurethane material or a thermoplastic polyurethane (TPU) material.

* * * * *